US011909109B2

(12) United States Patent
Astakhov et al.

(10) Patent No.: US 11,909,109 B2
(45) Date of Patent: Feb. 20, 2024

(54) COMPACT COMBINED CELLULAR/GNSS ANTENNA WITH LOW MUTUAL COUPLING

(71) Applicant: Topcon Positioning Systems, Inc., Livermore, CA (US)

(72) Inventors: Andrey Vitalievich Astakhov, Moscow (RU); Pavel Petrovich Shamatulsky, Moscow (RU); Anton Pavlovich Stepanenko, Moscow (RU); Sergey Nikolaevich Yemelianov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 300 days.

(21) Appl. No.: 17/595,312

(22) PCT Filed: Apr. 23, 2021

(86) PCT No.: PCT/RU2021/000170

§ 371 (c)(1),
(2) Date: Nov. 13, 2021

(87) PCT Pub. No.: WO2022/225412

PCT Pub. Date: Oct. 27, 2022

(65) Prior Publication Data

US 2022/0344805 A1 Oct. 27, 2022

(51) Int. Cl.
*H01Q 21/00* (2006.01)
*H01Q 1/52* (2006.01)
(Continued)

(52) U.S. Cl.
CPC ............ *H01Q 1/523* (2013.01); *H01Q 1/241* (2013.01); *H01Q 9/0435* (2013.01);
(Continued)

(58) Field of Classification Search
CPC ...... H01Q 1/523; H01Q 1/241; H01Q 9/0435; H01Q 21/0025; H01Q 1/1214; H01Q 1/3275
See application file for complete search history.

(56) References Cited

U.S. PATENT DOCUMENTS 10,381,734 B2 8/2019 Astakhov et al.
10,483,633 B2 11/2019 Wu et al.
(Continued)

FOREIGN PATENT DOCUMENTS

CN 111641041 A 9/2020
CN 212571359 U 2/2021
CN 212991308 U 4/2021

OTHER PUBLICATIONS

Goncharova et al., "A high efficient automotive roof-antenna concept for LTE, DAB-L, GNSS and SDARS with low mutual coupling," 2015, 2015 9th European Conference on Antennas and Propagation (EuCAP), pp. 1-5.
(Continued)

*Primary Examiner* — Joseph J Lauture
(74) *Attorney, Agent, or Firm* — Chiesa Shahinian & Giantomasi PC

(57) ABSTRACT

A combined cellular/GNSS (global navigation satellite systems) antenna is provided. The combined cellular/GNSS antenna comprises an external area and an internal area delineated by a circumference of a circle. The combined cellular GNSS antenna further comprises a cellular antenna and a GNSS antenna. The cellular antenna comprises a set of cellular radiators disposed in the external area and connected to a cellular feeding network for excitation of the set of cellular radiators. The GNSS antenna comprises radiation elements disposed in the internal area and has a center located substantially at a center of the circle.

10 Claims, 9 Drawing Sheets

(51) Int. Cl.
*H01Q 1/24* (2006.01)
*H01Q 9/04* (2006.01)
*H01Q 1/32* (2006.01)
*H01Q 1/12* (2006.01)

(52) U.S. Cl.
CPC ....... *H01Q 21/0025* (2013.01); *H01Q 1/1214* (2013.01); *H01Q 1/3275* (2013.01)

(56) References Cited

U.S. PATENT DOCUMENTS

2019/0140354 A1 5/2019 Astakhov et al.
2019/0173165 A1 6/2019 Wu et al.
2021/0119316 A1* 4/2021 Borchani ............... H01Q 21/28

OTHER PUBLICATIONS

Cui et al., "An Omnidirectional Multiband Antenna for Railway Application," 2020, in IEEE Antennas and Wireless Propagation Letters, vol. 19, No. 1, pp. 54-58.
International Search Report and Written Opinion dated Dec. 23, 2021, in connection with International Patent Application No. PCT/RU2021/000170, filed Apr. 23, 2021, 8 pgs.
Kalpanadevi et al., "Design and Analysis of Wilkinson Power Divider Using Microstrip Line and Coupled Line Techniques," IOSR Journal of Electronics and Communication Engineering (IOSR-JECE), International Conference on Electrical, Information and Communication Technologies (ICEICT-2017), pp. 34-35.

* cited by examiner

COMPACT COMBINED CELLULAR/GNSS ANTENNA WITH LOW MUTUAL COUPLING

TECHNICAL FIELD

The present invention relates generally to antennas, and more particularly to a compact combined cellular/Global Navigation Satellite Systems (GNSS) antenna with low mutual coupling.

BACKGROUND

Modern high-precision positioning receivers provide for both reception of GNSS (global navigation satellite system) signals and transmission of corrections via cellular networks. Therefore, receivers are typically equipped not only with GNSS antennas, but also cellular antennas, for example, of the 4G/LTE (fourth generation Long Term Evolution) standard. Since antennas are generally designed to reduce overall housing dimensions, the cellular and GNSS antennas may be located too close to each other, resulting in an increase in mutual coupling between the cellular and GNSS antennas and an increase in interference during GNSS signal reception.

Recently, antennas have been proposed having a cellular antenna disposed relatively close to a GNSS antenna, but oriented sideways. It has been shown that isolation between the GNSS and cellular antennas is about −10 dB (decibels). Since the cellular antenna in this design has a height noticeably exceeding that of the GNSS antenna, the cellular antenna may negatively affect the radiation pattern of the GNSS antenna. In particular, the cellular antenna may cause partial deterioration of the azimuth radiation pattern of the GNSS antenna, considerable offset of the phase center towards the symmetry axis of the GNSS antenna, and a high level of radiation pattern back lobe for the GNSS antenna.

U.S. Pat. No. 10,483,633 discloses a multifunctional GNSS antenna comprising a first and a second dielectric board arranged in a stacked manner. These boards include a metallization layer, and radiating elements of both GNSS and 4G antennas are formed using this metallization layer. The radiating element of the cellular antenna is disposed at an edge and a lateral surface of the first dielectric plate. In this design, the cellular antenna is positioned below the GNSS antenna, and the influence of the cellular antenna on the radiation pattern of the GNSS antenna is reduced. However, the radiation pattern of the cellular antenna can be distorted due to impacting metalized layers of the GNSS antenna. Since the design of the cellular antenna has no symmetry relative to the design of the GNSS antenna, the negative influence of the GNSS antenna on the cellular antenna can be relatively strong. To diminish mutual coupling between the GNSS and cellular antennas, an extra filter is proposed, which increases antenna cost.

A reduction in the lateral dimension of the receiver's housing results in decreasing the ground plane of the GNSS antenna. Correspondingly, the level of back lobe of the radiation pattern in the GNSS antenna increases causing greater positioning error due to multipath reception. It is especially the case for the low-frequency portion of the GNSS band, as the ratio of ground plane dimension to the wavelength is the smallest.

U.S. Pat. No. 10,381,734 discloses a patch antenna where the back lobe of the radiation pattern decreases due to a set of wires connecting the radiation patch and the ground plane. However, said wires are located in the peripheral area of the patch antenna, thereby preventing the placement of elements of the cellular antenna in this peripheral area. In addition, the close arrangement of the wires of the GNSS antenna and elements of the cellular antenna makes adjustment of the cellular antenna difficult, especially in the low-frequency range.

BRIEF SUMMARY OF THE INVENTION

The present invention proposes a compact cellular/GNSS (global navigation satellite systems) antenna comprising a cellular antenna and a GNSS antenna with low mutual coupling. The cellular antenna has a symmetrical azimuth radiation pattern without distortion in radiation pattern and the phase center of the GNSS antenna. In addition, when arranged in the housing of a compact receiver, the GNSS antenna has a low level of the back lobe.

In accordance with one embodiment, a combined cellular/GNSS (global navigation satellite systems) antenna is provided. The combined cellular/GNSS antenna comprises an external area and an internal area delineated by a boundary defined by a circumference of a circle. The combined cellular GNSS antenna further comprises a cellular antenna and a GNSS antenna. The cellular antenna comprises a set of cellular radiators disposed in the external area and connected to a cellular feeding network for excitation of the set of cellular radiators. The GNSS antenna comprises radiation elements disposed in the internal area and having a center located substantially at a center of the circle.

In one embodiment, the cellular antenna further comprises an output port. An output port of the cellular feeding network is the output port of the cellular antenna. The cellular feeding network and a ground plane of the GNSS antenna may be disposed on a PCB (printed circuit board).

In one embodiment, the set of cellular radiators of the cellular antenna provide for a low level of back lobe for the GNSS antenna. Each cellular radiator in the set of cellular radiators comprises at least one vertical conductor substantially parallel to a center axis of the circle and at least one horizontal conductor substantially perpendicular to the center axis of the circle. The at least one horizontal conductor of the set of cellular radiators of the cellular antenna and the radiation elements of the GNSS antenna are disposed on a PCB. Each of the at least one horizontal conductor of the set of cellular radiators comprises a first end and a second end, the first end being connected to a corresponding one of the at least one vertical conductor of the set of cellular radiators and the second end being insulated. A first side of the combined cellular/GNSS antenna comprises the at least one horizontal conductor of the set of cellular radiators and a second side of the combined cellular/GNSS antenna comprises a ground plane of the GNSS antenna. The first end and the second end of each of the at least one horizontal conductor of the set of cellular radiators are arranged such that a rotation from the first end towards the second end about the center axis occurs in a counterclockwise direction with respect to the first side of the combined cellular/GNSS antenna.

In one embodiment, the set of cellular radiators comprises four identical cellular radiators equidistantly disposed around the circumference with 90 degree rotational symmetry relative to a center axis of the circle.

In one embodiment, the cellular feeding network comprises a first microstrip line, a second microstrip line, a third microstrip line, and a fourth microstrip line, each of a substantially same length and a Wilkinson divider. A first end of the first microstrip line is connected to a first cellular radiator, a first end of the second microstrip line is connected to a second cellular radiator, a first end of the third microstrip line is connected to a third cellular radiator, and a first end of the fourth microstrip line is connected to a fourth cellular radiator. A second end of the first microstrip line and a second end of the third microstrip line are connected to each other at a first junction point and a second end of the second microstrip line and a second end of the fourth microstrip line are connected to each other at a second junction point. A first input of the Wilkinson divider is connected to the first junction point and a second input of the Wilkinson divider is connected to the second junction point. An output of the Wilkinson divider is an output port of the cellular feeding network.

These and other advantages of the invention will be apparent to those of ordinary skill in the art by reference to the following detailed description and the accompanying drawings.

DETAILED DESCRIPTION

Figure 1A:
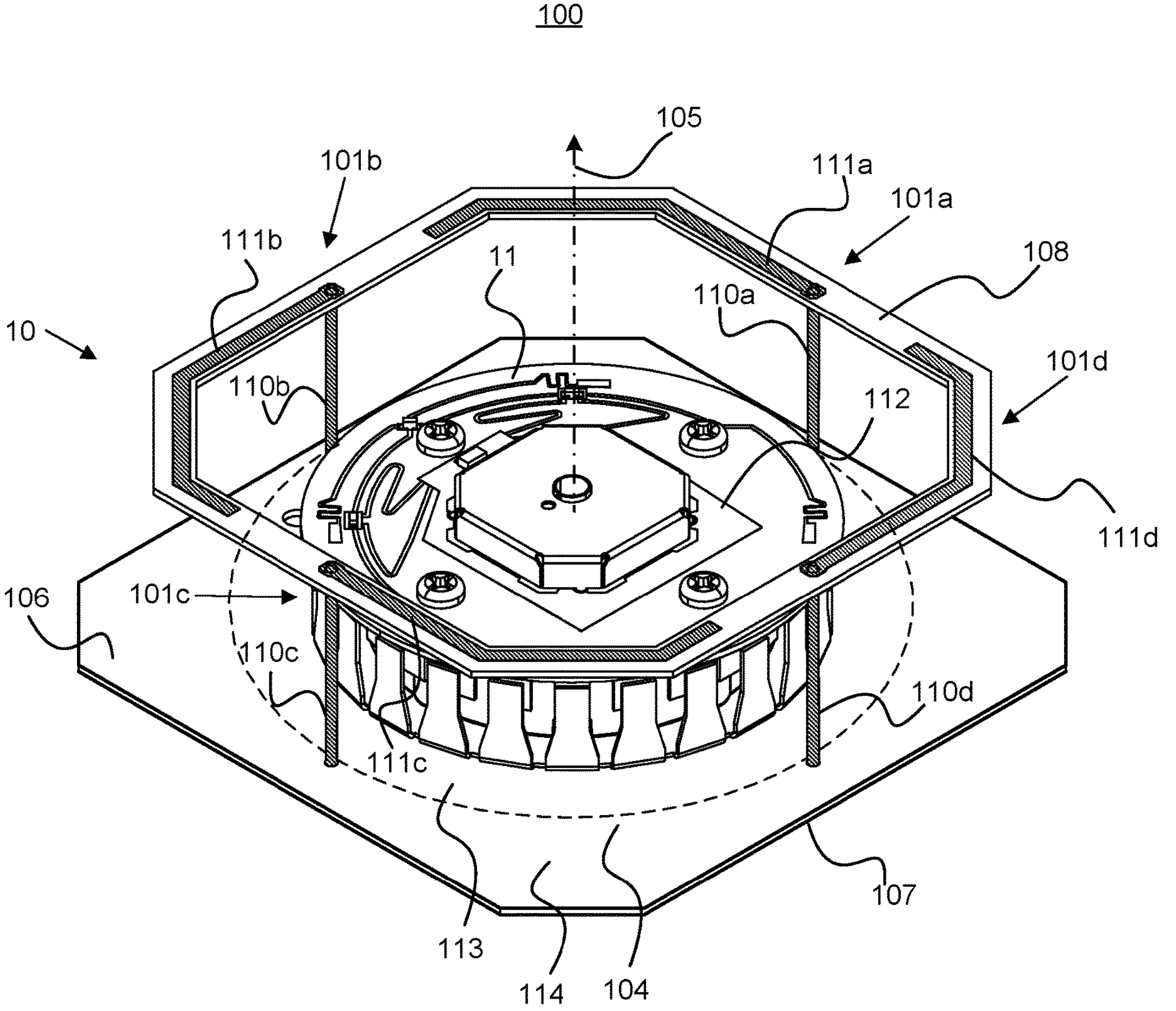
FIG. 1A illustratively shows a top isometric view of a combined cellular/GNSS (global navigation satellite systems) antenna, in accordance with one or more embodiments.

Embodiments disclosed herein provide for a compact combined cellular/GNSS (global navigation satellite system) antenna comprising a cellular antenna and a GNSS antenna with low mutual coupling. The cellular antenna comprises a circular antenna array of radiating elements symmetrically disposed around the GNSS antenna and excited in-phase. This ensures a symmetrical radiation pattern of the cellular antenna, as well as a symmetrical radiation pattern and a stable phase center of the GNSS antenna. The cellular antenna excites a linearly-polarized wave having a phase that does not depend on the azimuth angle. The GNSS antenna excites a right-hand circularly polarized wave whose phase is linearly dependent on the azimuth angle. Thus, the cellular antenna and the GNSS antenna excite orthogonal spherical harmonics, thereby providing a large isolation event at a close mutual location of both antennas. Embodiments disclosed herein will be further described with reference to the drawings, in which like reference numerals represent the same or similar elements.

Figure 1B:
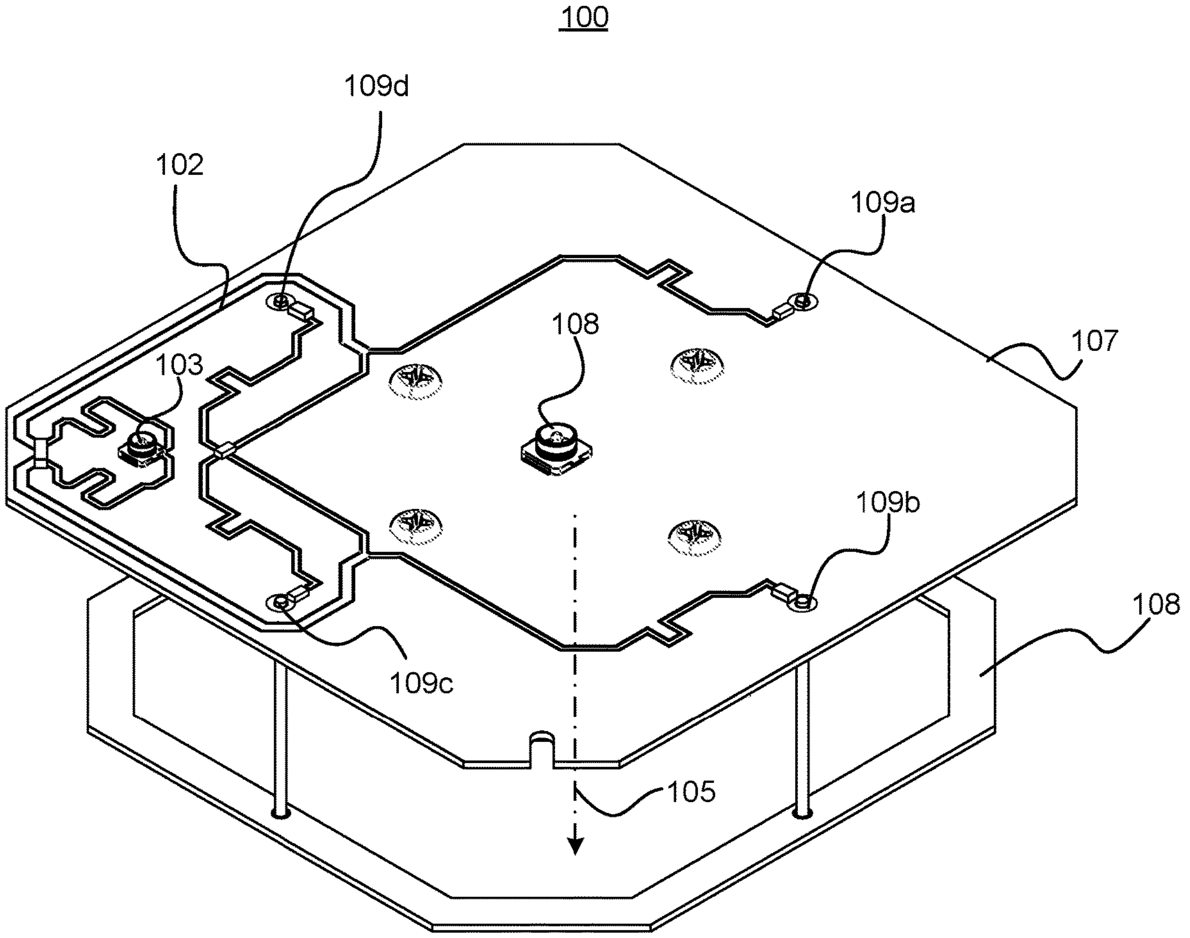
FIG. 1B illustratively shows a bottom isometric view of a combined cellular/GNSS antenna, in accordance with one or more embodiments.

FIGS. 1A-1B illustratively show a combined cellular/GNSS (global navigation satellite system) antenna 100, in accordance with one or more embodiments. FIG. 1A shows a top isometric view of the combined cellular/GNSS antenna 100 and FIG. 1B shows a bottom isometric view of the combined cellular/GNSS antenna 100. The combined cellular/GNSS antenna 100 comprises a cellular antenna 10 and a GNSS antenna 11.

Combined cellular/GNSS antenna 100 comprises an external area 114 and an internal area 113 delineated or separated by a boundary defined by the circumference of a circle 104. Accordingly, internal area 113 is the area bounded within the circumference of circle 104 and external area 114 is the area bounded between the circumference of circle 104 and an external perimeter of combined cellular/GNSS antenna 100 (i.e., an external perimeter of PCB (printed circuit board) 107). Circle 104 has a radius R and a center at center axis 105.

Cellular antenna 10 comprises a circular antenna array of a set of identical cellular radiators 101*a*, 101*b*, 101*c*, and 101*d*, and a cellular feeding network 102. Cellular radiators 101*a*, 101*b*, 101*c*, and 101*d* are equidistantly disposed around the circumference of circle 104 in external area 114. Accordingly, cellular radiators 101*a*, 101*b*, 101*c*, and 101*d* have 90 degree rotational symmetry relative to the center axis 105. Center axis 105 is directed towards the maximal level of the signal received by GNSS antenna 11.

Each cellular radiator 101*a*, 101*b*, 101*c*, and 101*d* comprises a set of conducting elements made such that they ensure the operation of cellular antenna 10 in the suitable cellular network frequency band. For example, an LTE (long-term evolution) cellular antenna operates at frequency bands from 698 MHz (megahertz) to 960 MHz and from 1427.9 MHz to 2700 MHz. In one embodiment, each set of conducting elements of cellular radiators 101*a*, 101*b*, 101*c*, and 101*d* comprise one or more vertical conductor pins and one or more horizontal conductors. The vertical conductor pins are substantially parallel to center axis 105 and the horizontal conductors are substantially perpendicular to center axis 105. For example, as shown in FIG. 1A, cellular radiator 101*a* comprises vertical conductor pin 110*a* and horizontal conductor 111*a*, cellular radiator 101*b* comprises vertical conductor pin 110*b* and horizontal conductor 111*b*, cellular radiator 101*c* comprises vertical conductor pin 110*c* and horizontal conductor 111*c*, and cellular radiator 101*d* comprises vertical conductor pin 110*d* and horizontal conductor 111*d*. Horizontal conductors 111*a*, 111*b*, 111*c*, and 111*d* are disposed on PCB 108. The conducting elements of cellular radiators 101*a*, 101*b*, 101*c*, and 101*d* can be made, for example, on a flexible PCB bent in the form of a cylinder whose longitudinal axis coincides with center axis 105 and whose radius is equal to the radius of circle 104.

Cellular feeding network 102 comprises input ports 109*a*, 109*b*, 109*c*, and 109*d* and an output port. Each cellular radiator 101*a*, 101*b*, 101*c*, and 101*d* is connected to a respective input port 109*a*, 109*b*, 109*c*, and 109*d* of cellular feeding network 102. The output port of cellular feeding network 102 is connected to connector 103, which is at the same time the output of cellular antenna 10. Cellular feeding network 102 provides in-phase excitation of cellular radiators 101*a*, 101*b*, 101*c*, and 101*d*.

GNSS antenna 11 is adjusted to receive RHCP (right-hand circular polarized) waves in the GNSS frequency band. For example, GNSS antenna 11 may operate at frequency bands from 1165 MHz to 1300 MHz and from 1530 MHz to 1605 MHz. GNSS antenna 11 comprises ground plane 106 and radiation elements 112. A radiation path can be also a radiation element of the GNSS antenna. Radiation elements 112 are disposed in internal area 113. Accordingly, cellular radiators 101*a*, 101*b*, 101*c*, and 101*d* are symmetrically disposed around GNSS antenna 11.

Figure 4A:
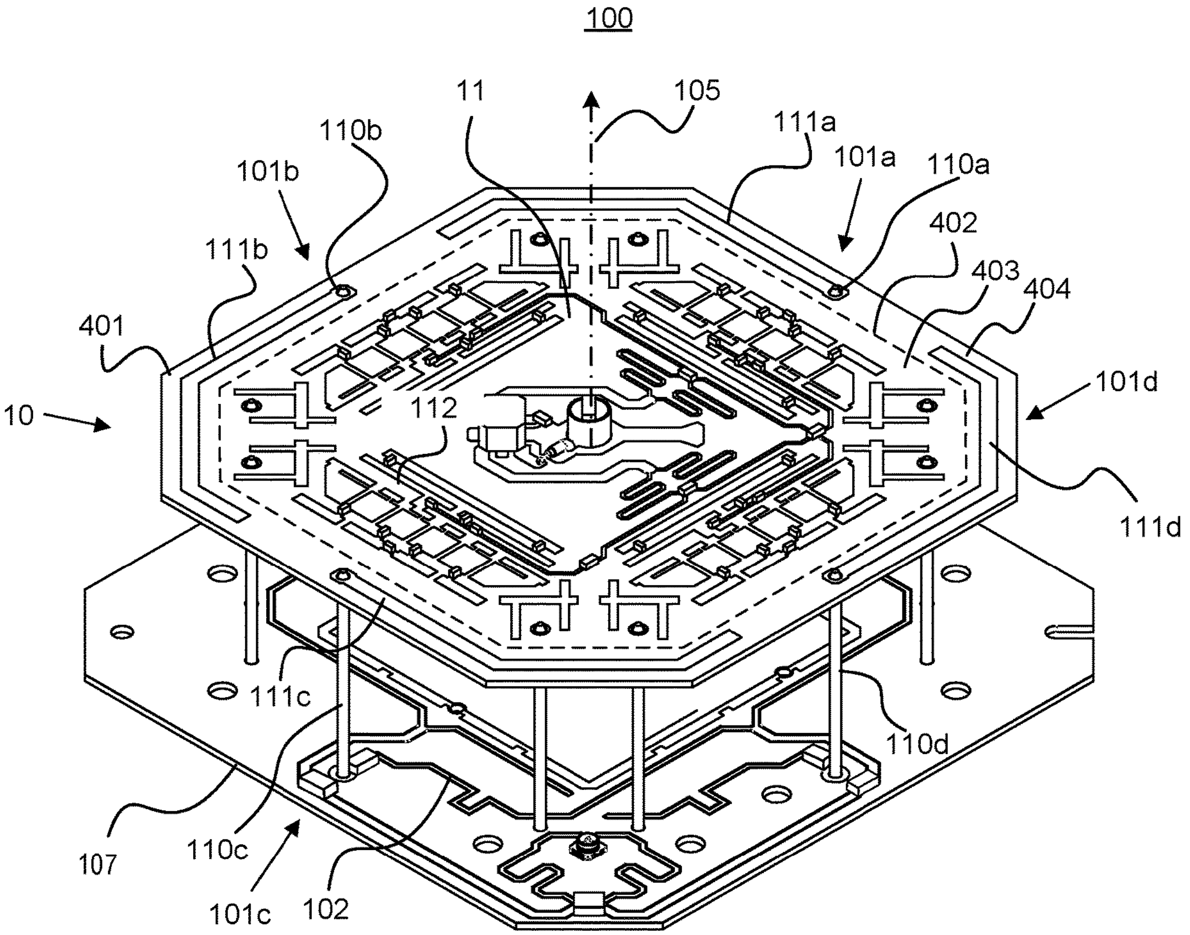
FIG. 4A illustratively shows an isometric view of a combined cellular/GNSS antenna, in accordance with one or more embodiments.

In one embodiment, ground plane 106 may be a metallization layer of PCB 107. In this embodiment, cellular feeding network 102 can be placed within another metallization layer of PCB 107. For example, FIG. 1B shows an embodiment of combined cellular/GNSS antenna 100 where cellular feeding network 102 is disposed on a lower metallization layer of PCB 107, while FIG. 4A shows an embodiment of combined cellular/GNSS antenna 100 where cellular feeding network 102 is disposed on a top metallization layer of PCB 107.

GNSS antenna 11 comprises output connector 108, which may be disposed on PCB 107. The center of GNSS antenna 11 is located at center axis 105, which is the center of circle 104. Cellular radiators 101*a*, 101*b*, 101*c*, and 101*d* of cellular antenna 10 are thus located symmetrically around GNSS antenna 11.

Figure 2:
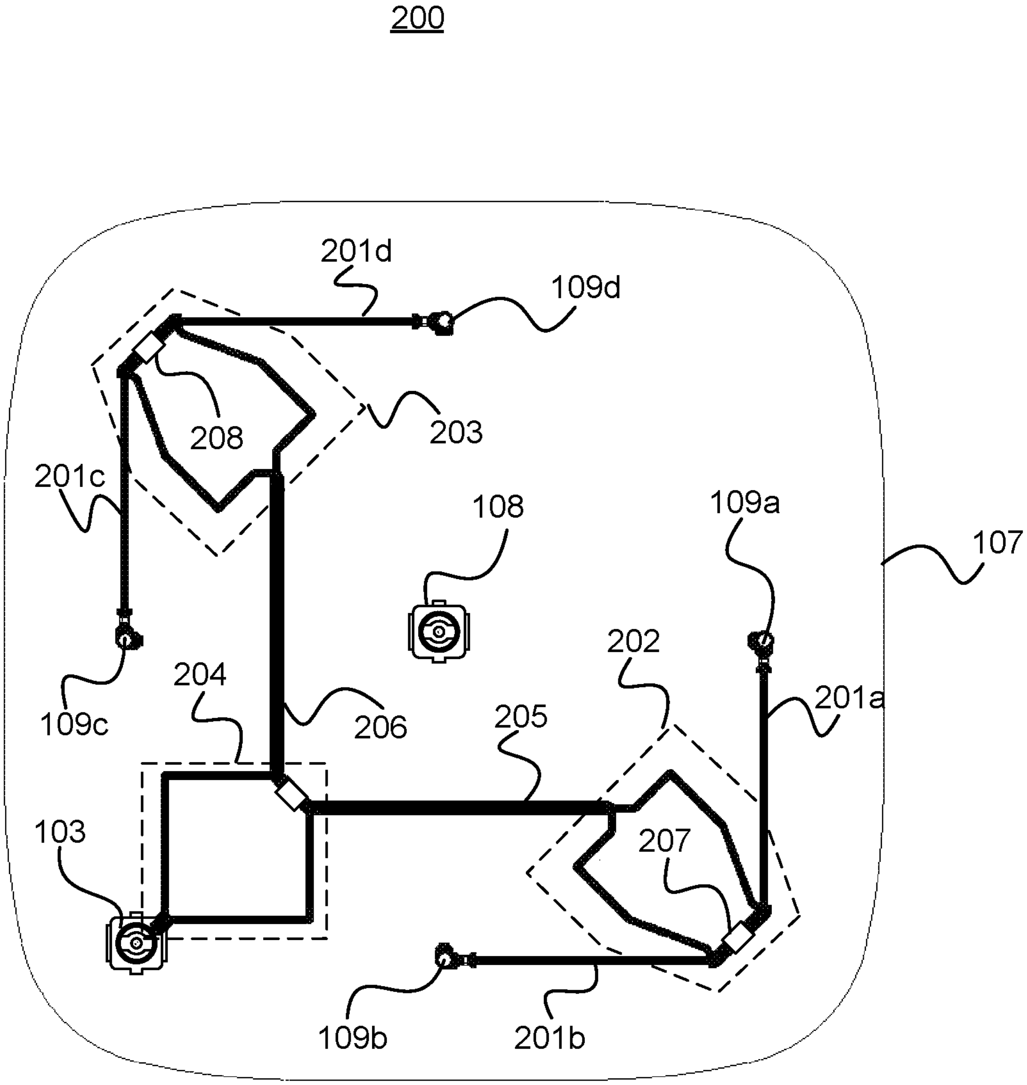
FIG. 2 illustratively shows a cellular feeding network of a cellular antenna, in accordance with one or more embodiments.

FIG. 2 illustratively shows a cellular feeding network 200 of a cellular antenna, in accordance with one or more embodiments. In one embodiment, cellular feeding network 200 is cellular feeding network 102 of cellular antenna 10 of combined cellular/GNSS antenna 100 of FIG. 1. Cellular feeding network 200 comprises Wilkinson dividers 202, 203, and 204. Input ports of Wilkinson dividers 202 and 203 are connected to input ports 109*a*, 109*b*, and 109*c*, 109*d*, respectively, using microstrip lines 201*a*, 201*b*, 201*c*, and 201*d* of the same length. Output ports of Wilkinson dividers 202 and 203 are connected to input ports of Wilkinson divider 204 with microstrip lines 205 and 206 of the same length. The output port of Wilkinson divider 204 is connected to connector 103. In such a way, in-phase excitation of cellular radiators 101*a*, 101*b*, 101*c*, and 101*d* is provided. A drawback of cellular feeding network 200 is its contribution to considerable loss in GNSS antenna 11. Since GNSS antenna 11 is adjusted to receive circularly polarized signals, waves induced by GNSS antenna 11 in input ports 109*a*, 109*b*, 109*c*, and 109*d* have a 90 degree phase shift and current flows through ballast resistors 207 and 208 causing some loss of GNSS signal power.

Figure 3:
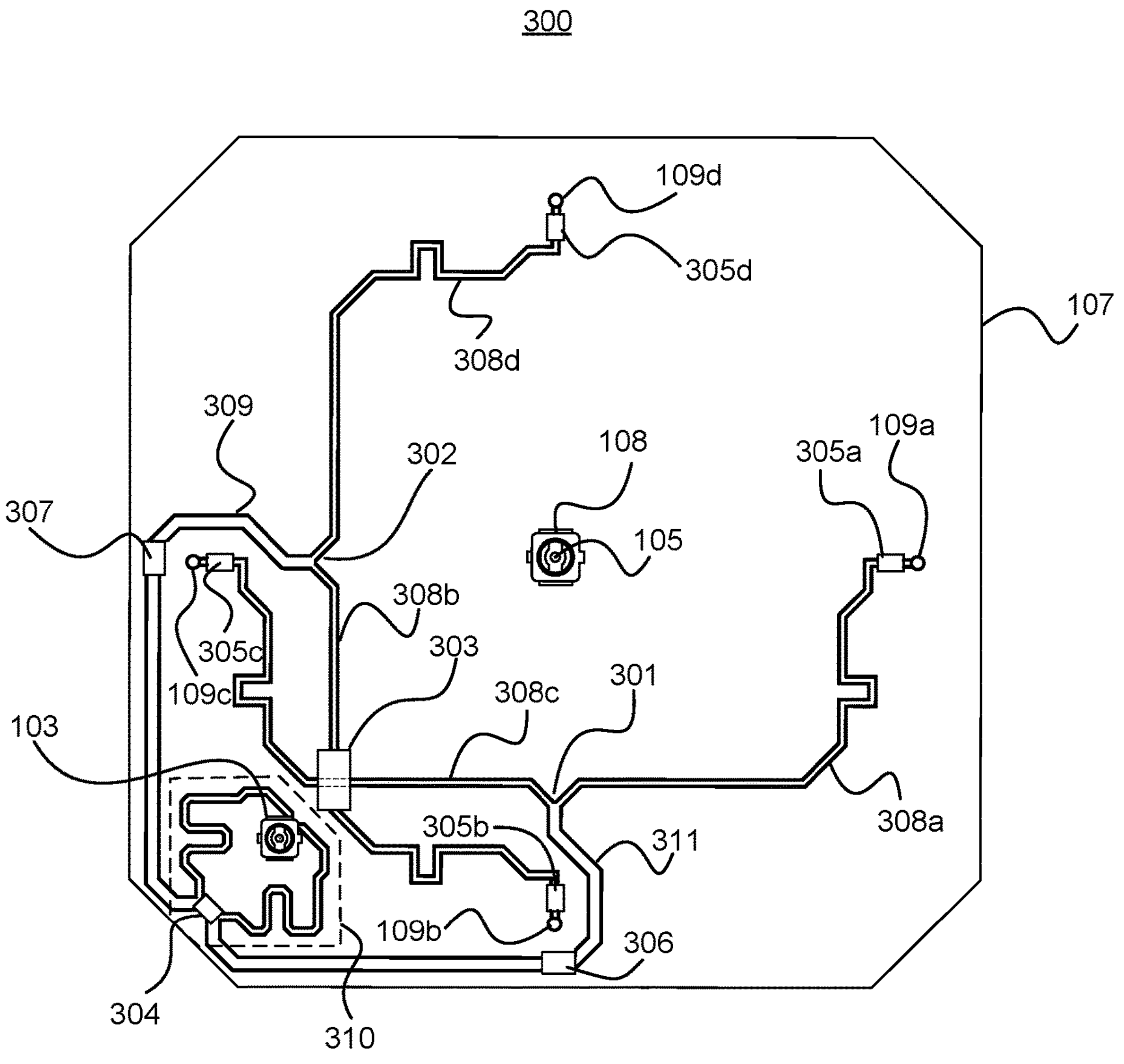
FIG. 3 illustratively shows another cellular feeding network of a cellular antenna, in accordance with one or more embodiments.

FIG. 3 illustratively shows a cellular feeding network 300 of a cellular antenna, in accordance with one or more embodiments. In one embodiment, cellular feeding network 300 is cellular feeding network 102 of cellular antenna 10 of combined cellular/GNSS antenna 100 of FIG. 1. Cellular feeding network 300 provides in-phase excitation of cellular radiators 101*a*, 101*b*, 101*c*, and 101*d* without loss in the GNSS signal. As shown in FIG. 3, cellular feeding network 300 comprises four microstrip lines 308*a*, 308*b*, 308*c*, and 308*d* of the same length. Microstrip lines 308*a* and 308*c* are respectively connected to input ports 109*a* and 109*c* and microstrip line 311 is connected to a first input of Wilkinson divider 310. Microstrip lines 308*a*, 308*c*, and 311 are connected to each other at junction point 301. Similarly, microstrip lines 308*b* and 308*d* are respectively connected to input ports 109*b* and 109*d* and microstrip line 309 is connected to a second input of Wilkinson divider 310. Microstrip lines 308*b*, 308*d*, and 309 are connected to each other at junction point 302. An output port of Wilkinson divider 310 is connected to connector 103. Microstrip line 308 comprises a break where microstrip lines 308*b* and 308*c* would cross and capacitor 303 with an impedance close to that of a short-circuit in the operating frequency band is connected to this break.

Since ports 109*a* and 109*c* are arranged as being rotated 180 degrees from each other relative to center axis 105 (shown as going into and coming out of the page in FIG. 3), the waves induced by GNSS antenna 11 are anti-phase. Further, since lines 308*a* and 308*c* have the same length, these waves induced by GNSS antenna 11 are also anti-phase at junction point 301, resulting in subtraction of the waves at junction point 301. Thus, a wave induced by GNSS antenna 11 is not fed into line 311. Similarly, since input ports 109*b* and 109*d* are arranged as being rotated 180 degrees from each other relative to center axis 105, the waves induced by GNSS antenna 11 are anti-phase. Since lines 308*b* and 308*d* have the same length, waves induced by GNSS antenna 11 are also anti-phase at junction point 302, resulting in subtraction of the waves at junction point 302. Thus, a wave induced by GNSS antenna 11 is not fed to line 309. Therefore, no current is induced by GNSS antenna 11 in ballast resistor 304 of the Wilkinson divider 310, and cellular feeding network 102 does not contribute to loss in GNSS antenna 11.

To match cellular antenna 10, matching elements 305*a*, 305*b*, 305*c*, and 305*d* with reactive impedance can be respectively connected in line with microstrip lines 308*a*, 308*b*, 308*c*, and 308*d*. For example, matching elements 305*a*, 305*b*, 305*c*, and 305*d* may be inductors. Matching elements 306 and 307 with reactive impedance can also be respectively connected in line with microstrip lines 311 and 309. For example, matching elements 306 and 307 may be capacitors.

Figure 4B:
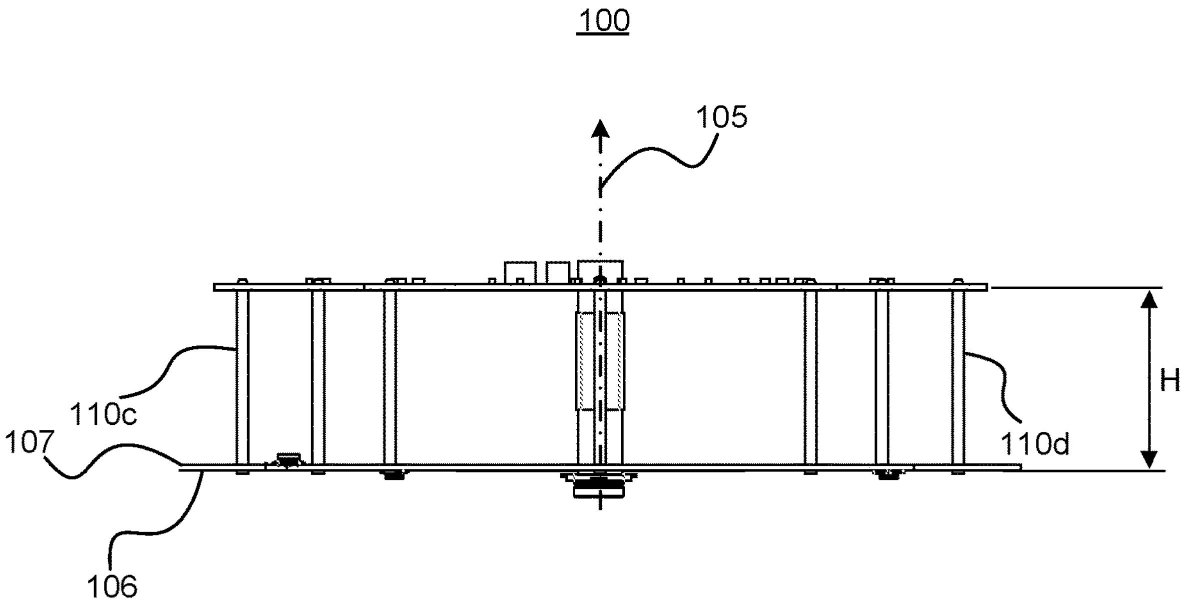
FIG. 4B illustratively shows a side view of a combined cellular/GNSS antenna, in accordance with one or more embodiments.
Figure 4C:
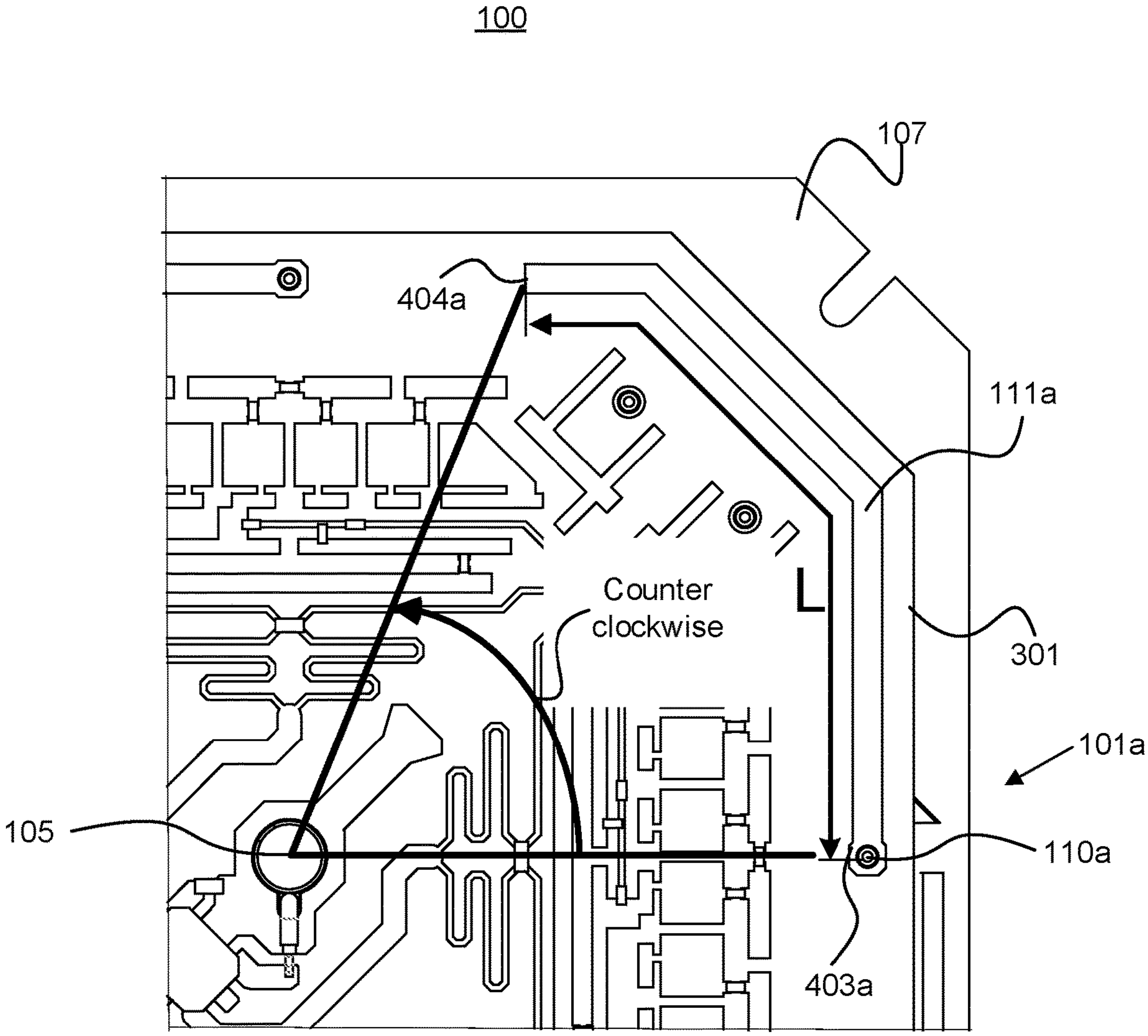
FIG. 4C illustratively shows a top down view of combined cellular/GNSS antenna, in accordance with one or more embodiments.

FIGS. 4A-4C illustratively show combined cellular/GNSS antenna 100, in accordance with one or more embodiments. FIG. 4A shows an isometric view of combined cellular/GNSS antenna 100, FIG. 4B shows a side view of combined cellular/GNSS antenna 100, and FIG. 4C shows a top down view of combined cellular/GNSS antenna 100.

In the embodiment of combined cellular/GNSS antenna 100 shown in FIGS. 4A-4C, radiation elements 112 of GNSS antenna 11 and horizontal conductors 111*a*, 111*b*, 111*c*, and 111*d* of cellular antenna 10 are disposed on the same PCB 401. PCB 401 comprises an internal area 403 and an external area 404 separated or delineated by boundary line 402. Accordingly, internal area 403 is bounded within boundary line 402 and external area 404 is bounded between boundary line 402 and an external perimeter of PCB 401. Radiation elements 112 of GNSS antenna 11 is disposed in internal area 403 of PCB 401. Horizontal conductors 111*a*, 111*b*, 111*c*, and 111*d* of cellular antenna 10 are disposed in external area 404 of PCB 401. An LNA (low noise amplifier) of GNSS antenna 11 can be disposed on PCB 107 or PCB 401.

Cellular radiators 101*a*, 101*b*, 101*c*, and 101*d* of cellular antenna 10 are configured to reduce the level of back lobe of GNSS antenna 11. The length L of horizontal conductors 111*a*, 111*b*, 111*c*, 111*d* (illustratively shown in FIG. 4C with respect to cellular radiator 101*a*) and height H of vertical conductors 110*a*, 110*b*, 110*c*, 110*d* (illustratively shown in FIG. 4B) can be selected to ensure matching of cellular antenna 10 in the cellular network frequency band and reduction in the level of back lobe of GNSS antenna 11. In one embodiment, height H is between 15-40 mm (millimeters) and length L is between 50-70 mm.

Each of horizontal conductor 111*a*, 111*b*, 111*c*, and 111*d* of respective cellular radiator 101*a*, 101*b*, 101*c*, and 101*d* comprises a first end and a second end. FIG. 4C illustratively shows horizontal conductor 111*a* as an example. A first end 403*a* of horizontal conductor 111*a* is connected to a corresponding vertical conductor 110*a* and a second end 404*a* of horizontal conductor 111*a* is isolated. To reduce the level of the back lobe of GNSS antenna 11, first end 403*a* and second end 404*a* are arranged such that a rotation in the smallest angle from first end 403*a* to second end 404*a* about center axis 105 occurs in a counter clockwise direction with respect to a top down view, as shown in FIG. 4C. Similarly, horizontal conductors 111*b*, 111*c*, and 111*d* each comprise a first end and a second end arranged such that a rotation in the smallest angle from first end to second end about center axis 105 occurs in a counter clockwise direction with respect to a top down view. Horizontal conductors 111*a*, 111*b*, 111*c*, 111*d* of cellular radiators 101*a*, 101*b*, 101*c*, and 101*d* are disposed on a first (e.g., top) side of combined cellular/GNSS antenna 100 and ground plane 106 is disposed on PCB 107 on a second (e.g., bottom) side of combined cellular/GNSS antenna 100.

Figure 5:
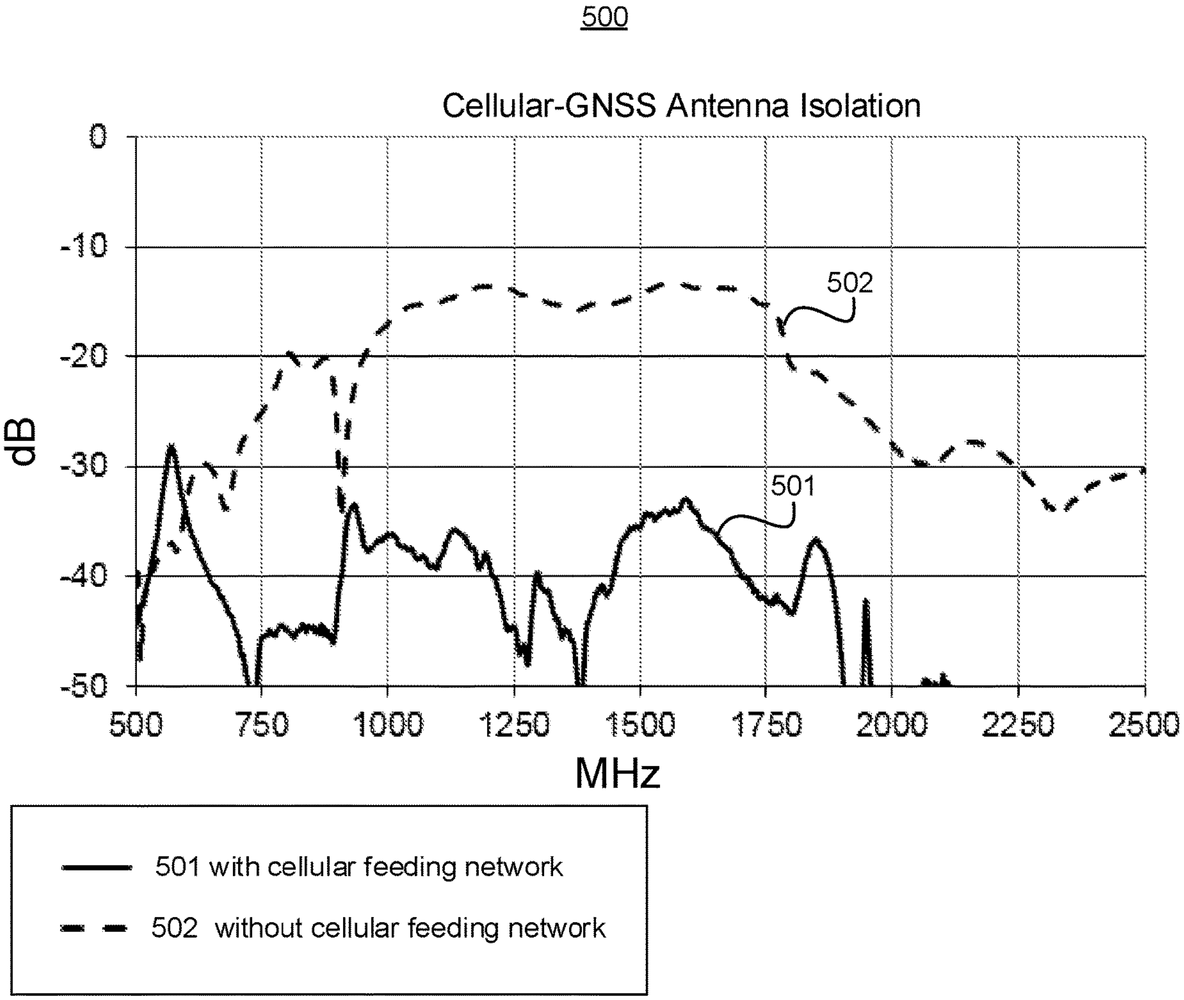
FIG. 5 shows a graph of dependences of the isolation between a cellular antenna and a GNSS antenna implemented in accordance with one or more embodiments.
Figure 6:
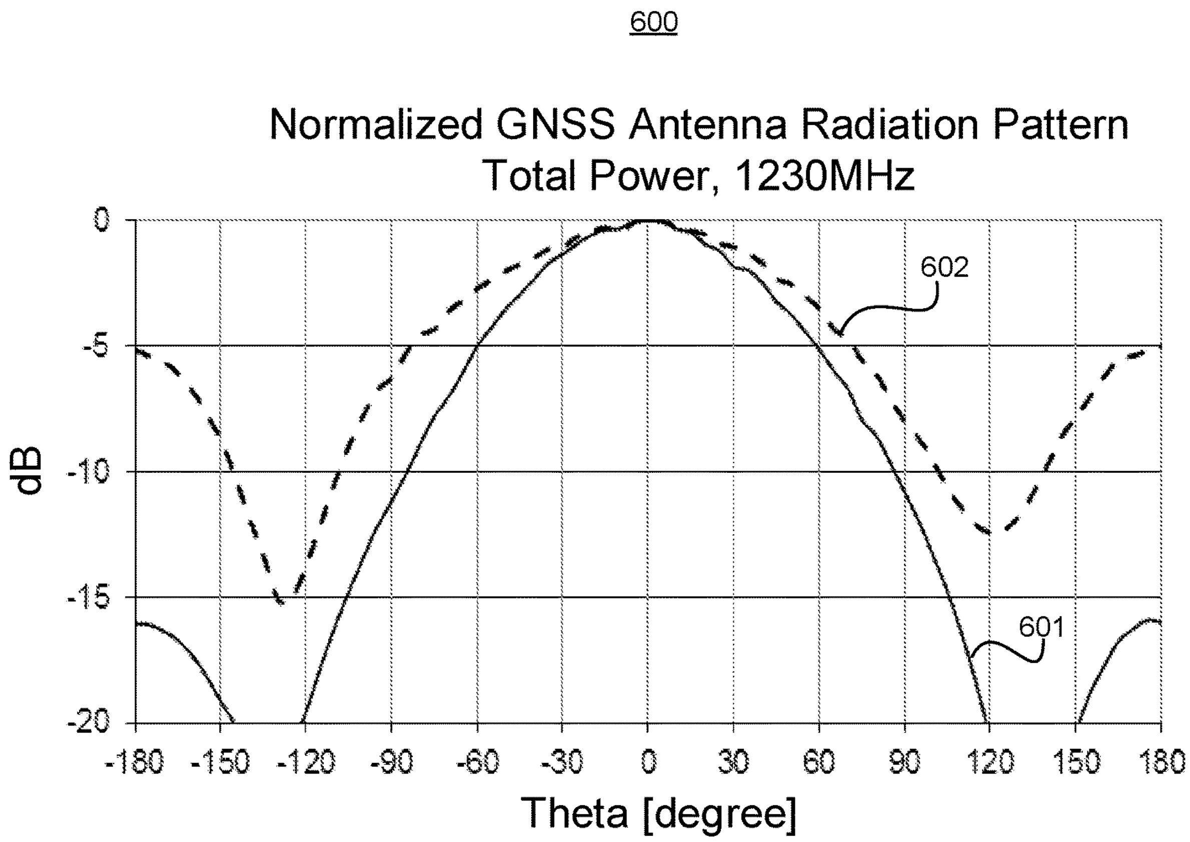
FIG. 6 shows a graph of the radiation patterns of the GNSS antenna implemented in accordance with one or more embodiments versus the meridional angle.

FIGS. 5 and 6 show experimental results for combined cellular/GNSS antenna 100 implemented in accordance with the embodiment shown in FIGS. 4A-4C. The following antenna parameters were utilized: height H=27 mm, length L=65 mm. Cellular feeding network 102 was implemented according to the embodiment shown in FIG. 3, where the inductors were 8 nH (nanny Henry) inductors.

FIG. 5 shows a graph 500 of dependences of the isolation between a cellular antenna and a GNSS antenna. Curve 501 corresponds to the case when cellular feeding network 102 was connected to cellular radiators 101*a*, 101*b*, 101*c*, and 101*d*. Note that isolation is about −30 dB and less within a frequency band between 680-2500 MHz. Curve 502 shows isolation between one cellular radiator 101*a* and GNSS antenna 11 where cellular feeding network 102 was not connected to cellular radiators 101*a*, 101*b*, 101*c*, and 101*d*. It can be seen that the value of isolation is about −15 dB. Accordingly, the use of cellular feeding network 102 according to embodiments disclosed herein allows for a better isolation between cellular antenna 10 and GNSS antenna 11.

FIG. 6 shows a graph 600 of the radiation patterns (in dB) of the GNSS antenna versus the meridional angle (in degrees). Curve 601 corresponds to the case where horizontal cellular antenna conductors 111*a*, 111*b*, 111*c*, and 111*d* are oriented according to the embodiment shown in FIG. 4C. In this embodiment, first end 403*a* and second end 404*a* of the horizontal conductor 111*a* are arranged such that a rotation in the smallest angle from first end 403*a* to second end 404*a* about center axis 105 occurs in a counter clockwise direction with respect to a top down view. As indicated above, first end 403*a* is connected to vertical conductor 110*a* and second end 404*a* is insulated. Horizontal conductors 111*b*, 111*c*, and 111*d* are similarly arranged. Curve 602 corresponds to another case where horizontal conductors 111*a*, 111*b*, 111*c*, 111*d* of cellular antenna 10 are oriented differently. In particular, first end 403*a* and second end 404*a* of horizontal conductor 111*a* are arranged such that a rotation in the smallest angle from first end 403*a* to second end 404*a* about center axis 105 occurs in a clockwise direction with respect to a top down view. It can be seen that with the orientation of the horizontal conductors 111*a*, 111*b*, 111*c*, and 111*d* of cellular antenna 10 in accordance with the embodiment shown in FIG. 4C results in a back lobe level of −16 dB, while the different orientation of the horizontal conductors 111*a*, 111*b*, 111*c*, and 111*d* results in a significantly deteriorating back lobe level of −5 dB.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A combined cellular/GNSS (global navigation satellite systems) antenna comprising:
- an external area and an internal area delineated by a boundary defined by a circumference of a circle;
- a cellular antenna comprising a set of cellular radiators disposed in the external area and connected to a cellular feeding network for excitation of the set of cellular radiators; and
- a GNSS antenna comprising radiation elements disposed in the internal area and having a center located substantially at a center of the circle.

2. The combined cellular/GNSS antenna of claim 1, wherein the cellular antenna further comprises an output port and wherein an output port of the cellular feeding network is the output port of the cellular antenna.

3. The combined cellular/GNSS antenna of claim 1, wherein the cellular feeding network and a ground plane of the GNSS antenna are disposed on a PCB (printed circuit board).

4. The combined cellular/GNSS antenna of claim 1, wherein the set of cellular radiators of the cellular antenna provide for a low level of back lobe for the GNSS antenna.

5. The combined cellular/GNSS antenna of claim 1, wherein each cellular radiator in the set of cellular radiators comprises at least one vertical conductor substantially parallel to a center axis of the circle and at least one horizontal conductor substantially perpendicular to the center axis of the circle.

6. The combined cellular/GNSS antenna of claim 5, wherein the at least one horizontal conductor of the set of cellular radiators of the cellular antenna and the radiation elements of the GNSS antenna are disposed on a PCB (printed circuit board).

7. The combined cellular/GNSS antenna of claim 5, wherein each of the at least one horizontal conductor of the set of cellular radiators comprises a first end and a second end, the first end being connected to a corresponding one of the at least one vertical conductor of the set of cellular radiators and the second end being insulated.

8. The combined cellular/GNSS antenna of claim 7, wherein a first side of the combined cellular/GNSS antenna comprises the at least one horizontal conductor of the set of cellular radiators and a second side of the combined cellular/GNSS antenna comprises a ground plane of the GNSS antenna, and wherein the first end and the second end of each of the at least one horizontal conductor of the set of cellular radiators are arranged such that a rotation from the first end towards the second end about the center axis occurs in a counterclockwise direction with respect to the first side of the combined cellular/GNSS antenna.

9. The combined cellular/GNSS antenna of claim 1, wherein the set of cellular radiators comprises four identical cellular radiators equidistantly disposed around the circumference with 90 degree rotational symmetry relative to a center axis of the circle.

10. The combined cellular/GNSS antenna of claim 1, wherein the cellular feeding network comprises:

a first microstrip line, a second microstrip line, a third microstrip line, and a fourth microstrip line, each of a substantially same length; and a Wilkinson divider, wherein a first end of the first microstrip line is connected to a first cellular radiator, a first end of the second microstrip line is connected to a second cellular radiator, a first end of the third microstrip line is connected to a third cellular radiator, and a first end of the fourth microstrip line is connected to a fourth cellular radiator, a second end of the first microstrip line and a second end of the third microstrip line are connected to each other at a first junction point and a second end of the second microstrip line and a second end of the fourth microstrip line are connected to each other at a second junction point, a first input of the Wilkinson divider is connected to the first junction point and a second input of the Wilkinson divider is connected to the second junction point, and an output of the Wilkinson divider is an output port of the cellular feeding network.

* * * * *